United States Patent [19]

Unno et al.

[11] Patent Number: 4,551,950
[45] Date of Patent: Nov. 12, 1985

[54] TRUING APPARATUS FOR A GRINDING WHEEL WITH ROUNDED CORNERS

[75] Inventors: Kunihiko Unno; Toshio Tsujiuchi; Yukio Oda, all of Kariya, Japan

[73] Assignee: Toyoda Koki Kabushiki Kaisha, Kariya, Japan

[21] Appl. No.: 634,430

[22] Filed: Jul. 26, 1984

[30] Foreign Application Priority Data

Aug. 2, 1983 [JP] Japan ............................... 58-141296

[51] Int. Cl.⁴ ............................................. B24B 53/14
[52] U.S. Cl. ............................ 51/165.87; 125/11 CD; 125/11 AT
[58] Field of Search ........................ 51/165.88, 165.87; 125/11 CD, 11 R, 11 AT

[56] References Cited

U.S. PATENT DOCUMENTS

| | | | |
|---|---|---|---|
| 3,584,616 | 6/1971 | Flohr | 125/11 CD |
| 4,103,668 | 8/1978 | Nishimura | 125/11 CD |
| 4,266,374 | 5/1981 | Asano | 125/11 CD |
| 4,274,231 | 6/1981 | Verega | 125/11 CD |
| 4,501,125 | 2/1985 | Yoneda | 51/165.88 |

*Primary Examiner*—Harold D. Whitehead
*Attorney, Agent, or Firm*—Oblon, Fisher, Spivak, McClelland & Maier

[57] ABSTRACT

A truing apparatus includes a truing tool supported on a tool support movable radially and axially of a grinding wheel having a rounded corner and drivable by a feed drive unit coupled to the tool support to move along a predetermined path for truing the rounded corner of the grinding wheel. At least one contact member for contacting outer peripheral and end surfaces of the grinding wheel is mounted on the tool support, and a sensor is also mounted on the tool support for detecting a contact between the contact member and the grinding wheel. A feed control system controls the feed drive unit for moving the truing tool along the predetermined path. The feed control system controls the feed drive unit so that the contact member will move radially and axially of the grinding wheel until the sensor is actuated immediately after one truing process and immediately before a next truing process. A grinding wheel position detector detects radial and axial positions of the grinding wheel when the sensor is actuated immediately after the one truing process and immediately before the next truing process. A correcting unit corrects the predetermined path along which the truing tool is to move in the next truing process based on the positions of the grinding wheel detected by the grinding wheel position detector immediately after the one truing process and immediately before the next truing process.

3 Claims, 4 Drawing Figures

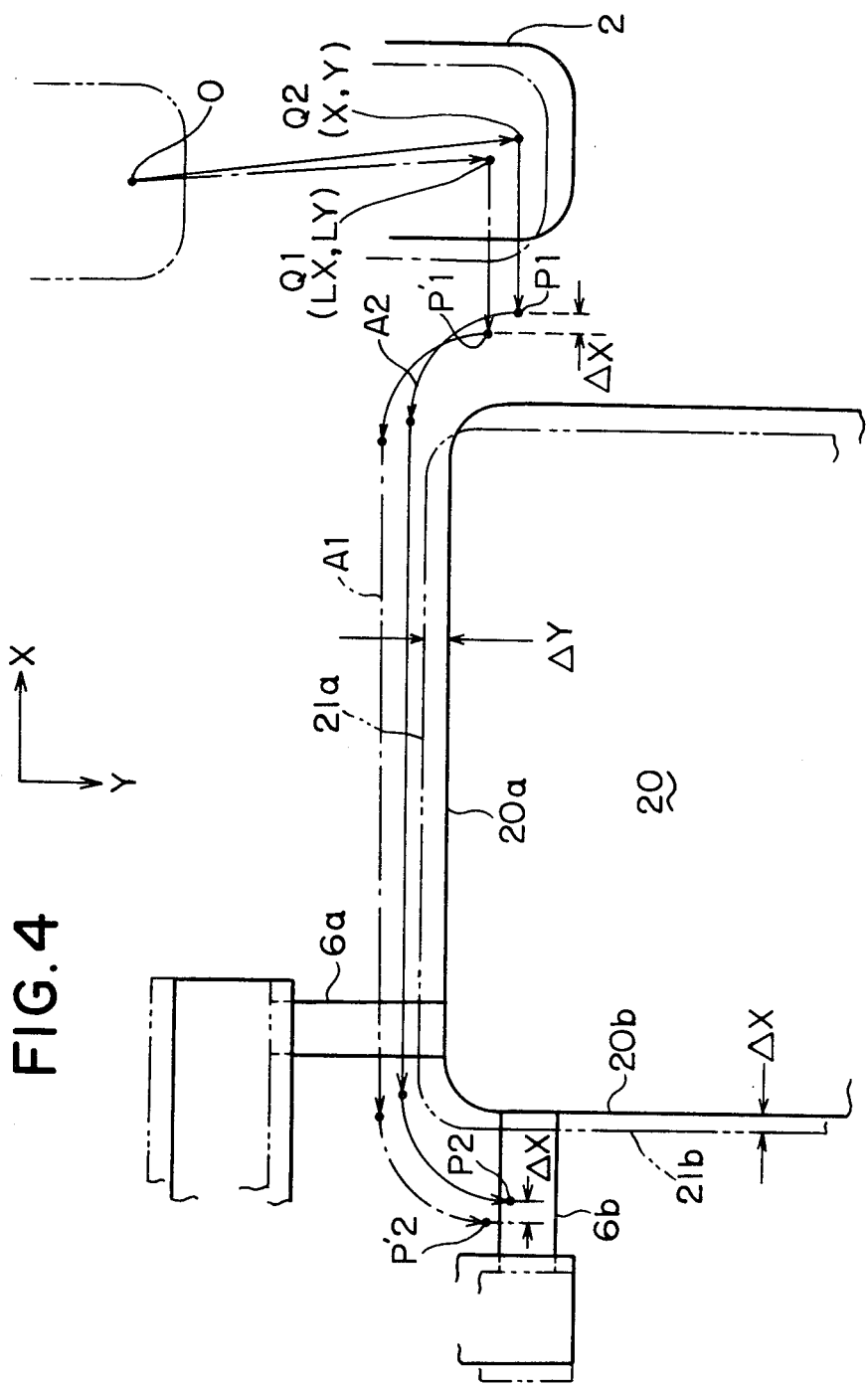

TRUING APPARATUS FOR A GRINDING WHEEL WITH ROUNDED CORNERS

BACKGROUND OF THE INVENTION

1. Field of the Invention

The present invention relates to a truing apparatus for accurately truing a grinding wheel with rounded corners.

2. Description of the Prior Art

There have been used in recent years so-called CBN grinding wheels which use a hard material such as cubic boron nitride as abrasives. Since the CBN grinding wheels are highly expensive, it is necessary in truing them to hold the extent of cutting by a truing tool to a minimum required only for removing wavy irregularities of the grinding wheel so that the grinding wheel will have as long a service life as possible. If the truing tool cut into the grinding wheel for too a small extent, then the wavy irregularities would not completely be removed, resulting in a poor grinding accuracy. Therefore, the truing apparatus for such grinding wheels are required that the extent of cutting by the truing tool be controlled at an accuracy of about ± a few $\mu$m. In actual truing processes, however, the grinding wheel is thermally expanded due to changes in the ambient temperature and bearing temperature, so that the position of the cylindrical grinding surface varies. The grinding wheel as it is grinded by the truing tool is subjected to small wear which tends to vary from time to time. Accordingly, to enable the truing tool to cut into the grinding wheel with the above accuracy, it is necessary that the truing tool cut to a fixed depth from a reference surface which is the grinding surface of the grinding wheel prior to truing. To this end, the position of the grinding surface being trued has to be accurately measured. One method of such measurement has been to detect the position of the grinding surface with a contact sensor for allowing the truing tool to cut to the desired depth from the grinding surface.

More specifically, grinding wheels having a single grinding surface have conventionally been trued in the following manner.

The truing tool is provided with a contact member movable normally to the grinding wheel. After a tip end of the contact member is aligned with the grinding surface of the truing tool, a truing head supporting the contact member is fed toward the grinding wheel. When a contact between the contact member and the grinding wheel is detected, that is, the grinding surfaces of the truing tool and the grinding wheel are aligned, the truing head is further fed along by a desired interval. Thereafter, the truing head is slid axially toward the grinding wheel to true the latter.

The above practice however has proven unsatisfactory with grinding wheels having end grinding surfaces with rounded corners as well as cylindrical grinding surfaces. More specifically, if the contact member contacted the cylindrical grinding surface normally thereto and detected the postion thereof, the detected signal would contain an error since the rounded corners of the grinding surface are axially displaced due to a thermal expansion of the grinding wheel. Accordingly, the grinding surface of the grinding wheel would not be accurately trued continuously along a desired curved line without compensating for the axial displacement of the rounded corners.

SUMMARY OF THE INVENTION

It is an object of the present invention to provide a truing apparatus capable of truing a rounded corner of a grinding wheel to a uniform extent with a high accuracy irrespectively of radial and axial displacements of the grinding wheel.

According to the present invention, briefly summarized, there is provided a truing apparatus including a truing tool supported on a tool support movable radially and axially of a grinding wheel having a rounded corner and drivable by a feed drive unit coupled to the tool support to move along a predetermined path for truing the rounded corner of the grinding wheel. At least one contact member for contacting outer peripheral and end surfaces of the grinding wheel is mounted on the tool support, and a sensor is also mounted on the tool support for detecting a contact between the contact member and the grinding wheel. A feed control system controls the feed drive unit for moving the truing tool along the predetermined path. The feed control system controls the feed drive unit so that the contact member will move radially and axially of the grinding wheel until the sensor is actuated immediately after one truing process and immediately before a next truing process. A grinding wheel position detector detects radial and axial positions of the grinding wheel when the sensor is actuated immediately after the one truing process and immediately before the next truing process. A correcting unit corrects the predetermined path along which the truing tool is to move in the next truing process based on the positions of the grinding wheel detected by the grinding wheel position detector immediately after the one truing process and immediately before the next truing process.

Displacements of the grinding wheel and a wear thereon between times immediately after the one truing process and immediately before the next truing process are determined, and the next truing is effected in a manner to compensate for such displacements and a wear. Therefore, the outer peripheral surface and the rounded corner of the grinding wheel can be trued highly accurately to a uniform extent or depth.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram illustrative of the movement of a truing tool.

DESCRIPTION OF THE PREFERRED EMBODIMENT

Figure 1:
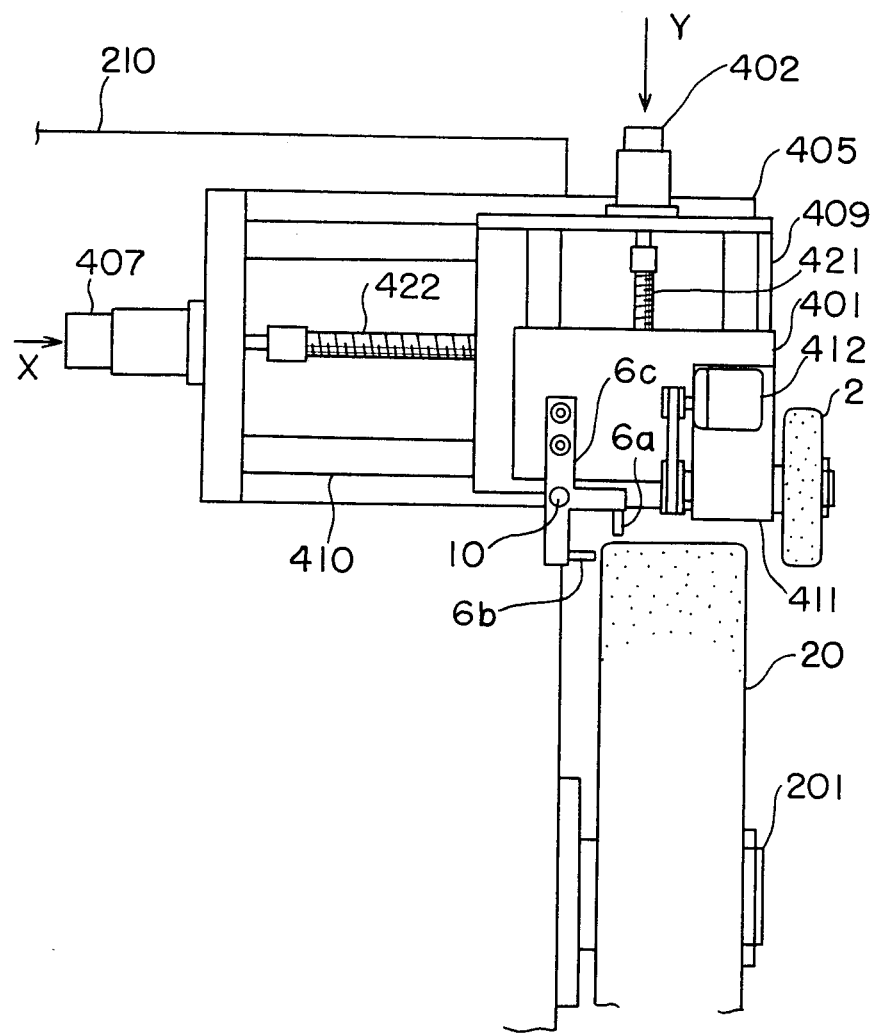
FIG. 1 is a plan view of a mechanism of a truing apparatus according to the present invention.

FIG. 1 shows a mechanism of a truing apparatus according to the present invention.

The truing apparatus mechanism includes a wheel head 210 having a wheel shaft 201 rotatably mounted therein for rotatably supporting a grinding wheel 20 to be trued. The wheel shaft 201 has a pulley (not shown)

on an opposite end to which rotative power is transmitted from a drive motor (not shown) for rotating the grinding wheel 20.

A truing tool drive device is mounted on the wheel head 210, and comprises a support 405 disposed on the wheel head 210 and having guide surfaces 410 for moving a traverse base 409 axially of the wheel shaft 20. The traverse base 409 can be moved axially of the wheel shaft 20 by a traverse servomotor 407 and a feed screw 422 coupled to a drive shaft of the servomotor 407. The traverse base 409 supports thereon a cutting head 401 for moving a truing tool or wheel 2 in a direction normal to the grinding wheel 20. The cutting head 401 has a feed screw 421 extending through a central hole therein and coupled to an output shaft of a servomotor 402 mounted on the traverse base 409 for controlling the extent of cutting by the truing tool 2. The feed screw 421 is threaded through a nut (not shown) fixed to the cutting head 401. Thus, the cutting head 401 can be moved in response to rotation of the servomotor 402. A support block 411 is mounted on the cutting head 401 and supports the truing tool 2 rotatably thereon. A drive motor 412 for rotating the truing tool 2 is mounted on the support block 411.

Contact members and a contact member drive unit will be described below.

The truing apparatus includes a pair of first and second contact members or probes 6a, 6b fixed relatively to each other and movable in unison by a common contact member drive unit in directions normal to and axially of the the grinding wheel 20. The truing tool drive unit, as described above, doubles as the contact member drive unit.

The first and second contact members 6a, 6b are supported by a contact member support 6c fixed to the cutting head 401 such that the first and second contact members 6a, 6b extend perpendiculary to each other. The first contact member 6a serves to detect a cylindrical grinding surface of the grinding wheel 20, and the second contact member 6b serves to detect an end grinding surface of the grinding wheel 20. The contact member support 6c also supports thereon a contact sensor 10. The first and second contact members 6a, 6b are moved by the servomotor 402 in a Y-axis direction normal to the grinding wheel 20, and by the servomotor 407 in a X-axis direction axially of the grinding wheel 20.

Figure 2:
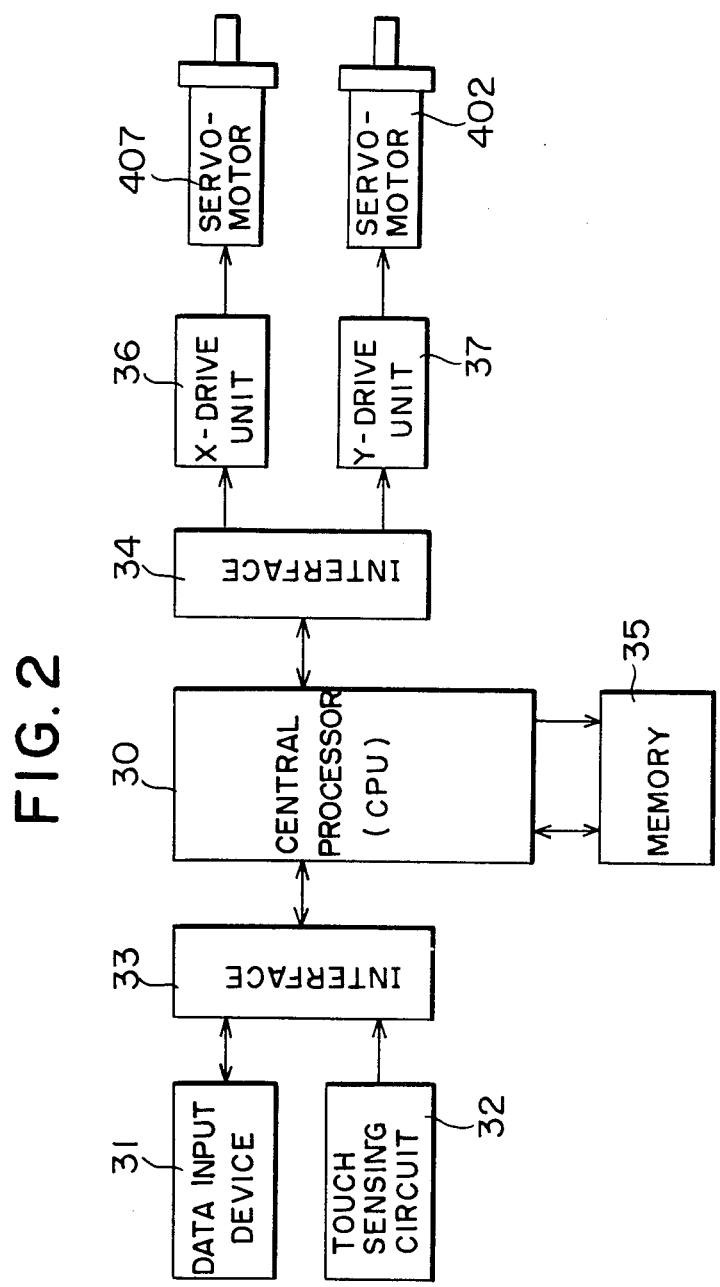
FIG. 2 is a block diagram of a numerical control system of the truing apparatus of the invention.

FIG. 2 illustrates in block form a numerial control system of the truing apparatus of the invention, the numerical control system being controlled by a computer. The computer comprises a central processor or processing unit (CPU) 30, interfaces 33, 34, and a memory 35. The CPU 30 is connected through the interface 33 to a data input device 31 and a touch sensing circuit 32 for detecting a contact or touch between the contact members and the grinding surfaces. Drive units 36, 37 for driving the servomotors 407, 402 respectively are connected through the interface 34 to the CPU 30.

Figure 3:
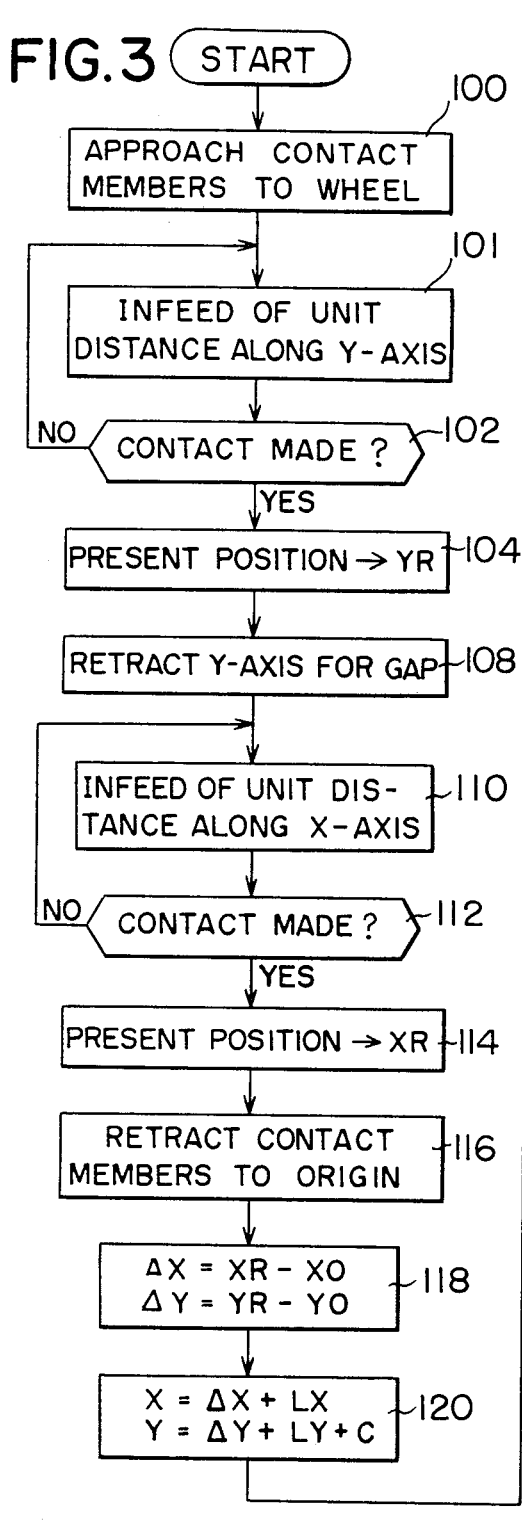
FIG. 3 is a flowchart of a process effected by a central processor in the numerical control system.
Figure 3:
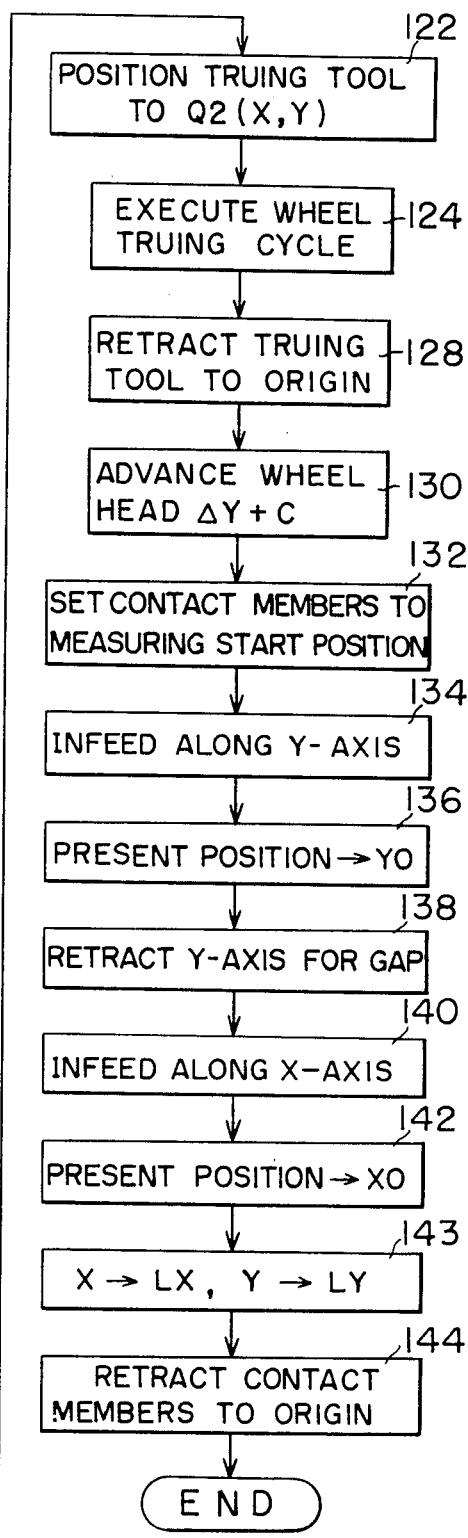

FIG. 3 is a flowchart showing progressive steps of operation of the computer. FIG. 4 is a diagram showing the principle of detecting displacements of the grinding surfaces of the grinding wheel with the contact members and correcting the path of movement of the truing tool 2. Steps 100 through 116 serve to detect the positions of the grinding surfaces 20a, 20b of the grinding wheel 20 with respect to the original positions of the contact members, and jointly constitute a contact member movement detector. In FIG. 4, the first contact member 6a is moved along the Y-axis direction normal to the grinding wheel 20 until it hits the grinding surface 20a and such a contact is detected by the touch sensor 10. When the contact member 6a contacts the grinding surface 20a, the Y-axis servomotor 402 is de-energized, and a feed interval of the contact member 6a is stored as YR in a step 104. The value of YR is indicative of the position of the grinding surface 20a with respect to the original position of the contact member 6a. After the contact member 6a is moved back a certain distance in a step 108, the second contact member 6b is moved in the X-axis direction until it hits the grinding surface 10b in a step 110, and a feed interval of the contact member 6b is stored as XR in a step 114. The value of XR is indicative of the position of the grinding surface 20b with respect to the original position of the contact member 6b. Then, the contact member 6b is moved back a certain distance in a step 116. Thus, the positions of the grinding surfaces prior to being trued are detected as the feed intervals of the contact members. Then, changes in the feed intervals of the contact members are determined in a step 118. More specifically, feed intervals of the contact members measured immediately after the grinding surfaces have been trued in a prior truing process are stored as XO, YO. The positional differences of the grinding surfaces are calculated and stored as $\Delta X$, $\Delta Y$, respectively. The two-dot-and-dash lines 21a, 21b in FIG. 4 are representative of the positions of the grinding surfaces of the grinding wheel 2 immediately after the prior truing cycle, as viewed in a fixed coordinate system of the wheel head 210. The value of $\Delta X$ calculated in the step 118 is indicative of a displacement or the grinding surface 20b in the X-axis direction, while the value of $\Delta Y$ calculated in the step 118 is indicative of a displacement of the grinding surface 20a in the Y-axis direction.

In a step 120, the coordinates of a current truing starting point Q2 (X, Y) of the truing tool 2 are corrected by the displacements $\Delta X$, $\Delta Y$ +C determined in the step 118 with respect to a previous truing starting point Q1 (LX, LY). More specifically, since the grinding surfaces of the grinding wheel 20 have been displaced ($\Delta X$, $\Delta Y$) from the positions of the grinding surfaces immediately after the prior truing cycle, the truing starting point is also moved with respect to the previous truing starting point. The value of C indiates an extent or depth by which each grinding surface is cut by the truing tool. The truing tool 2 is moved from its original position to the corrected truing starting point Q2 in a rapid feed mode, then from the truing starting point Q2 to a point P1 at a grinding or truing speed, and from the point P1 along a truing path A2 as illustrated to a point P2, which has been shifted $\Delta X$ in the X-axis direction from an ending point P'2 of the previous truing path. A step 124 numerically controls the truing tool drive unit so that the truing tool will follow the truing path. After the truing tool has arrived at the ending point P2, the truing tool is returned to the original position in a step 128. Thereafter, the wheel head 210 is moved $\Delta Y$+C in the direction normal to the grinding wheel 20. By thus moving the wheel head 210, the relative distance between the grinding surfaces and a workpiece remains the same as that immediately after the prior truing process.

Steps 132 through 144 serve to move the contact members in the X- and Y-axes directions with respect to the trued grinding surfaces, and measure and store the positions of the grinding surfaces with respect to the original reference positions of the contact members. Steps 132, 134 are the same as the steps 100–102. A feed interval detected in a step 136 for the grinding surface 20a is stored in YO as positional data of the grinding surface right after the previous truing cycle, the positional data being used in the step 118 for a next truing cycle. After the contact member has been returned a certain interval in the Y-axis direction in a step 138, a feed interval for the other grinding sruface 20b is similarly measured in a step 140 and stored in XO in a step 142. Then, the coordinates of the present truing starting point Q2 (X, Y) are stored as (LX, LY) in a step 143, and used as a reference for a next truing starting point. The contact members are returned to their original positions in a step 144. Thus, the grinding surfaces of the grinding wheel can be accurately trued while compensating for axial and radial displacements of the grinding wheel.

With the arrangementof the present invention, displacements of the grinding surfaces of the grinding wheel are determined with the positions thereof immediately prior to a previous truing cycle being used as references, and the truing path is corrected using the determined displacements so that the cylindrical and end grinding surfaces with a rounded corner can uniformly be trued to a constant extent or depth even if the grinding wheel are subjected to radial and axial displacements. Accordingly, a grinding wheel with rounded corners can accurately be trued to a minimum necessary extent or depth even when the grinding wheel is radially and axially displaced. The grinding wheel therefore has a long service life and can grind a workpiece with high accuracy.

Although a certain preferred embodiment has been shown and described, it should be understood that many changes and modifications may be made therein without departing from the scope of the appended claims.

What is claimed is:

1. A truing apparatus for truing a grinding wheel having a rounded corner, comprising:
   (a) truing tool;
   (b) tool support means for suppoting said truing tool and movable radially and axially of the grinding wheel;
   (c) feed drive means for moving said tool support means radially and axially of the grinding wheel;
   (d) first feed control means for controlling said feed drive means to move said truing tool along a predetermined path;
   (e) contact means attached to said tool support means for contacting said grinding wheel in radial and axial directions thereof;
   (f) contact detecting means for detecting a contact between said contact means and said grinding wheel;
   (g) second feed control means for controlling said feed drive means to move said contact means to approach outer peripheral and end surfaces of the grinding wheel until said contact detecting means is actuated immediately after one truing process and immediately before a next truing process;
   (h) grinding wheel position detecting means for detecting radial and axial positions of the grinding wheel when said contact detecting means is actuated immediately after said one truing process and immediately before said next truing process; and
   (i) correcting means for correcting said path given by said first feed control means based on the radial and axial positions of the grinding wheel which are detected by said grinding wheel position detecting means.

2. A truing apparatus according to claim 1, wherein said grinding wheel position detecting means includes subtracting means for determining the differences between the radial and axial positions of the grinding wheel immediately after said one truing process and the radial and axial positions of the grinding wheel immediately before said next truing process, said correcting means including means for correcting a starting position of said path given by said first feed control means based on said differences determined by said grinding wheel position detecting means.

3. A truing apparatus according to claim 2, wherein said contact means comprises a first contact member fixed to said tool support means and extending radially of the grinding wheel and a second contact member disposed for movement with said first contact member and extending axially of the grinding wheel.

* * * * *